United States Patent [19]
Becker et al.

[11] Patent Number: 5,306,069
[45] Date of Patent: Apr. 26, 1994

[54] SLIDING ROOF FOR AN AUTOMOBILE

[75] Inventors: Thomas Becker, Frankfurt; Albert Schlapp, Dreieich; Günther Pfeifer, Niedernberg, all of Fed. Rep. of Germany

[73] Assignee: Rockwell Golde GmbH, Fed. Rep. of Germany

[21] Appl. No.: 804,266

[22] Filed: Dec. 5, 1991

[30] Foreign Application Priority Data

Dec. 20, 1990 [DE] Fed. Rep. of Germany ....... 4040825

[51] Int. Cl.$^5$ ............................ B60J 7/053; B60J 7/22
[52] U.S. Cl. ..................................... 296/217; 296/222; 296/223
[58] Field of Search ................. 296/216, 217, 222-224, 296/214

[56] References Cited

U.S. PATENT DOCUMENTS

| | | | |
|---|---|---|---|
| 4,619,480 | 10/1986 | Motoyama et al. | 296/217 |
| 4,707,022 | 11/1987 | Roos et al. | 296/222 |
| 4,911,496 | 3/1990 | Fuerst | 296/220 |
| 4,911,497 | 3/1990 | Schreiter et al. | 296/222 |

Primary Examiner—Dennis H. Pedder

[57] ABSTRACT

In a sliding roof for automobiles, comprising a non-slidable, front wind deflector, pivotal at its front edge in a roof opening, and a rear sliding lid, slidably guided in the roof opening, the roof opening is filled by the mutually adjoining surfaces of wind deflector and sliding lid when the roof is closed. For creating a ventilation gap of high effectiveness between the rear edge of the wind deflector and the front edge of the sliding lid in conjunction with an aerodynamically favourable small pivoting out angle of the wind deflector, it is provided that the sliding lid, starting from its closed position, is pivotally journalled about a pivot axis provided in the vicinity of its rear edge, in the sense of lowering its front edge. For the opening displacement, the sliding lid is also lowered at its rear edge, with the result that, with low overall depth of the roof construction, the lid is displaceable approximately in a parallel orientation to the roof surface beneath a rear roof surface. A threaded cable drive assembly can be used to provide the actuating movements both of the wind deflector and of the sliding lid.

2 Claims, 13 Drawing Sheets

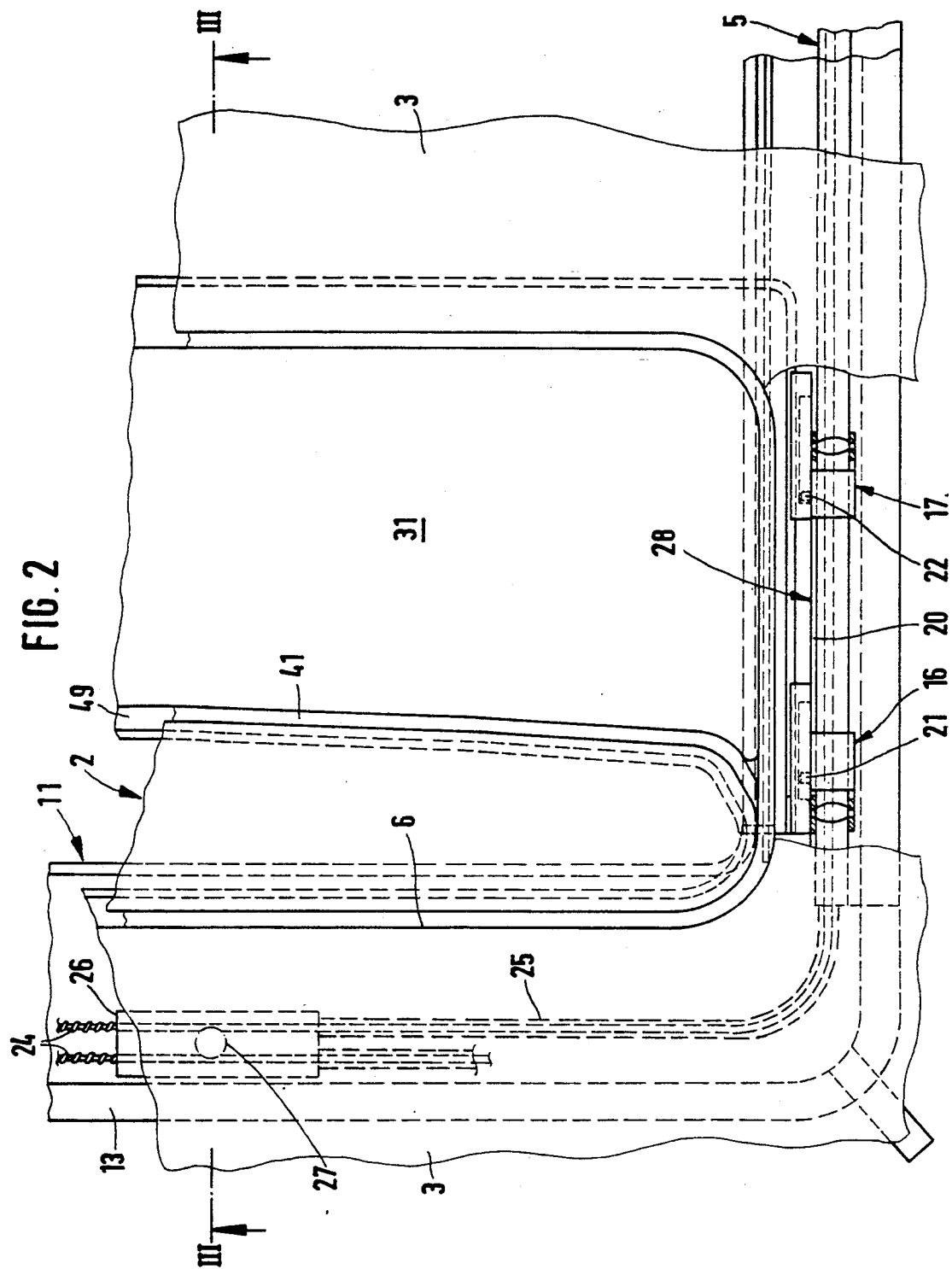

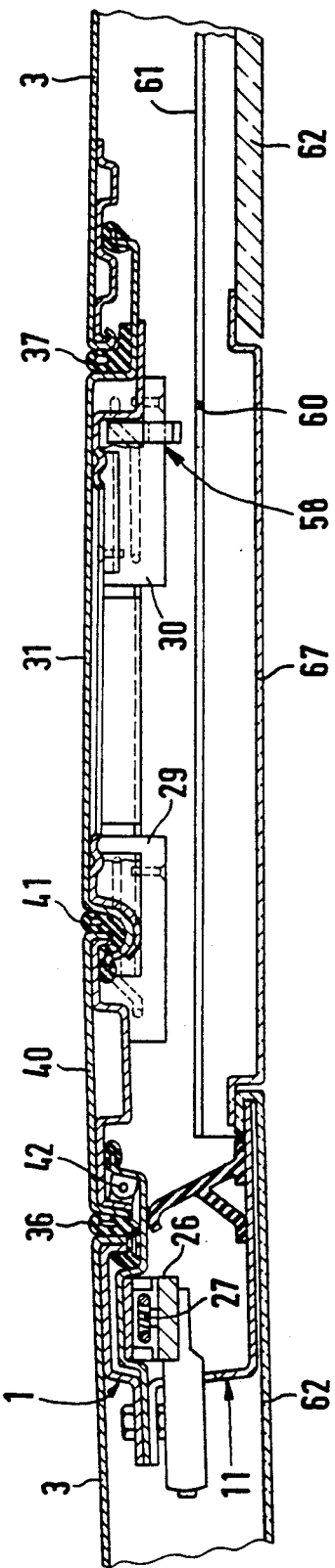

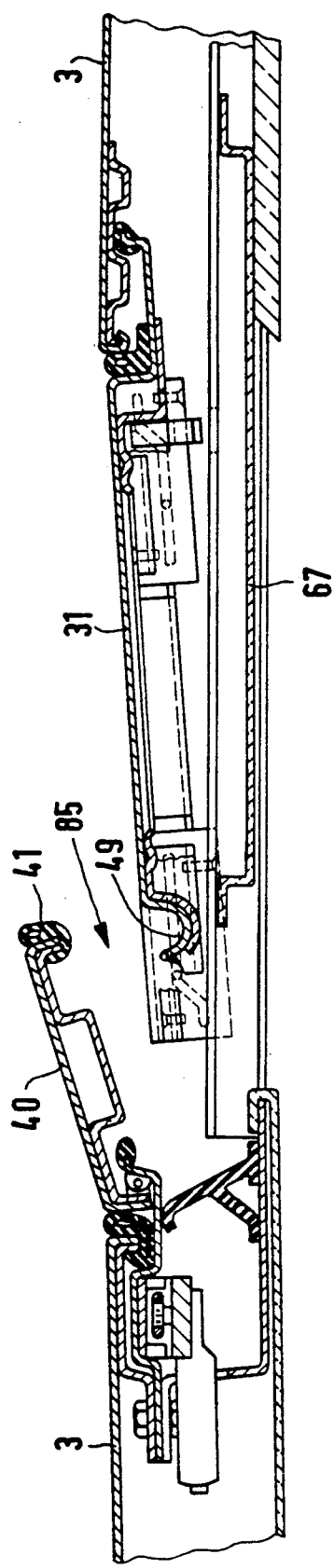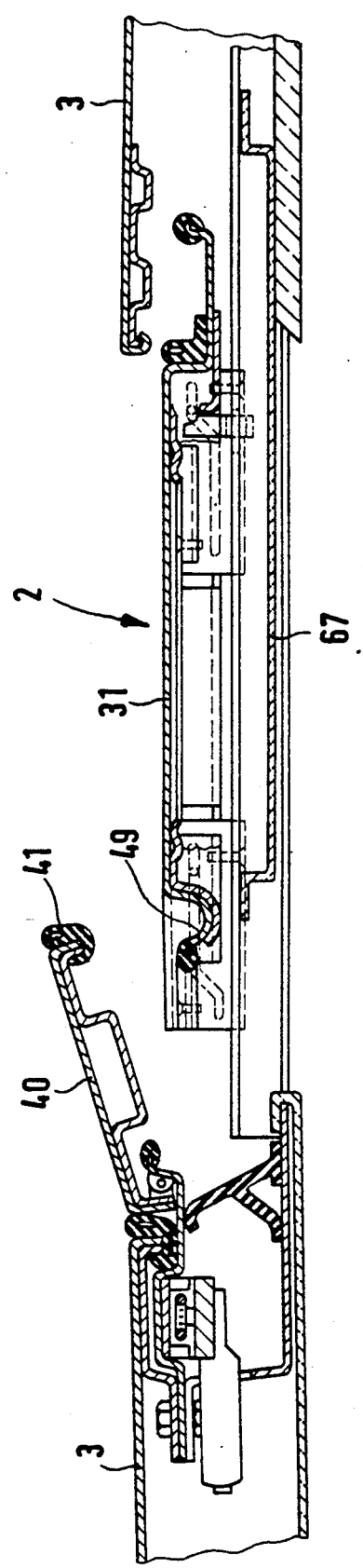

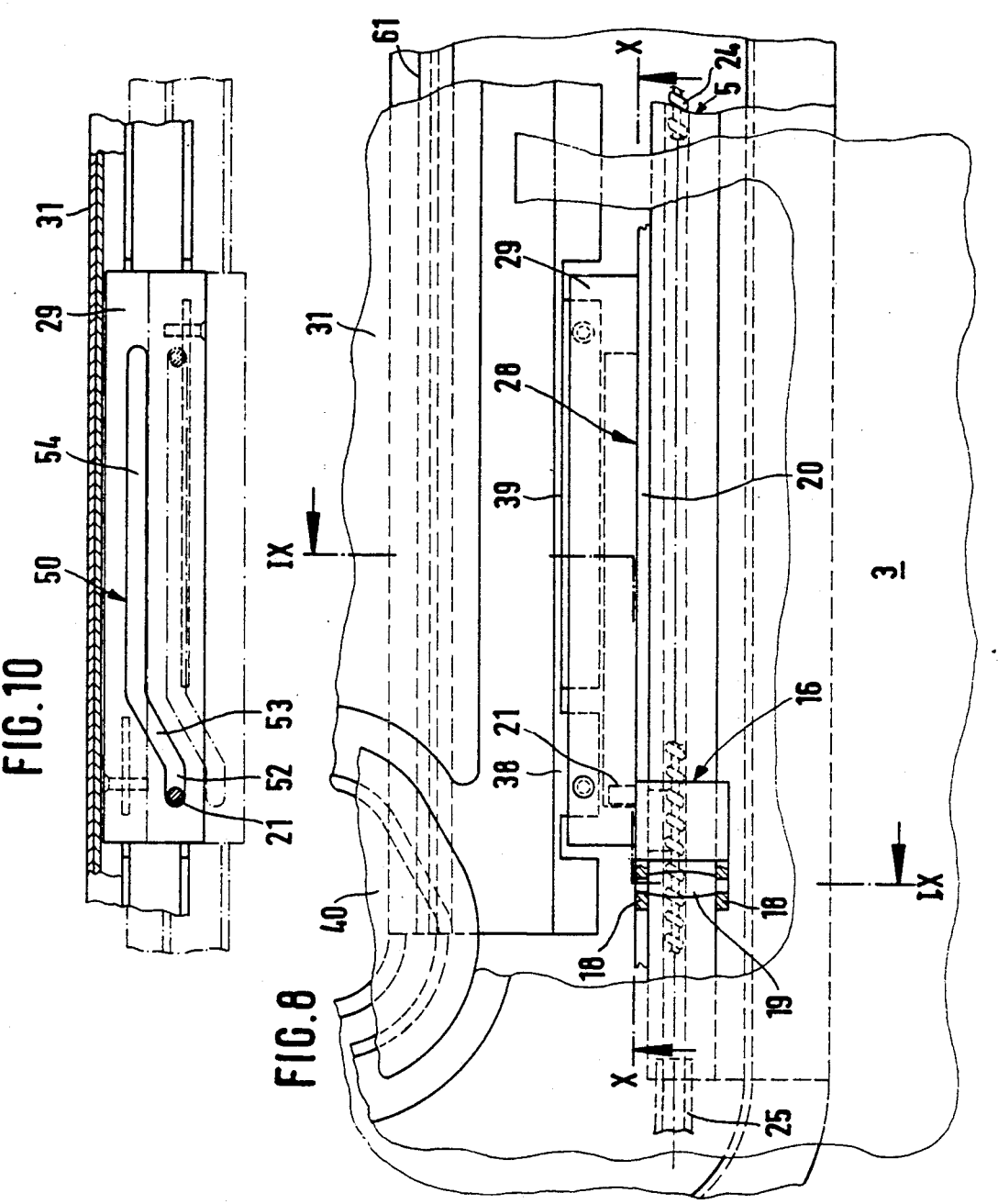

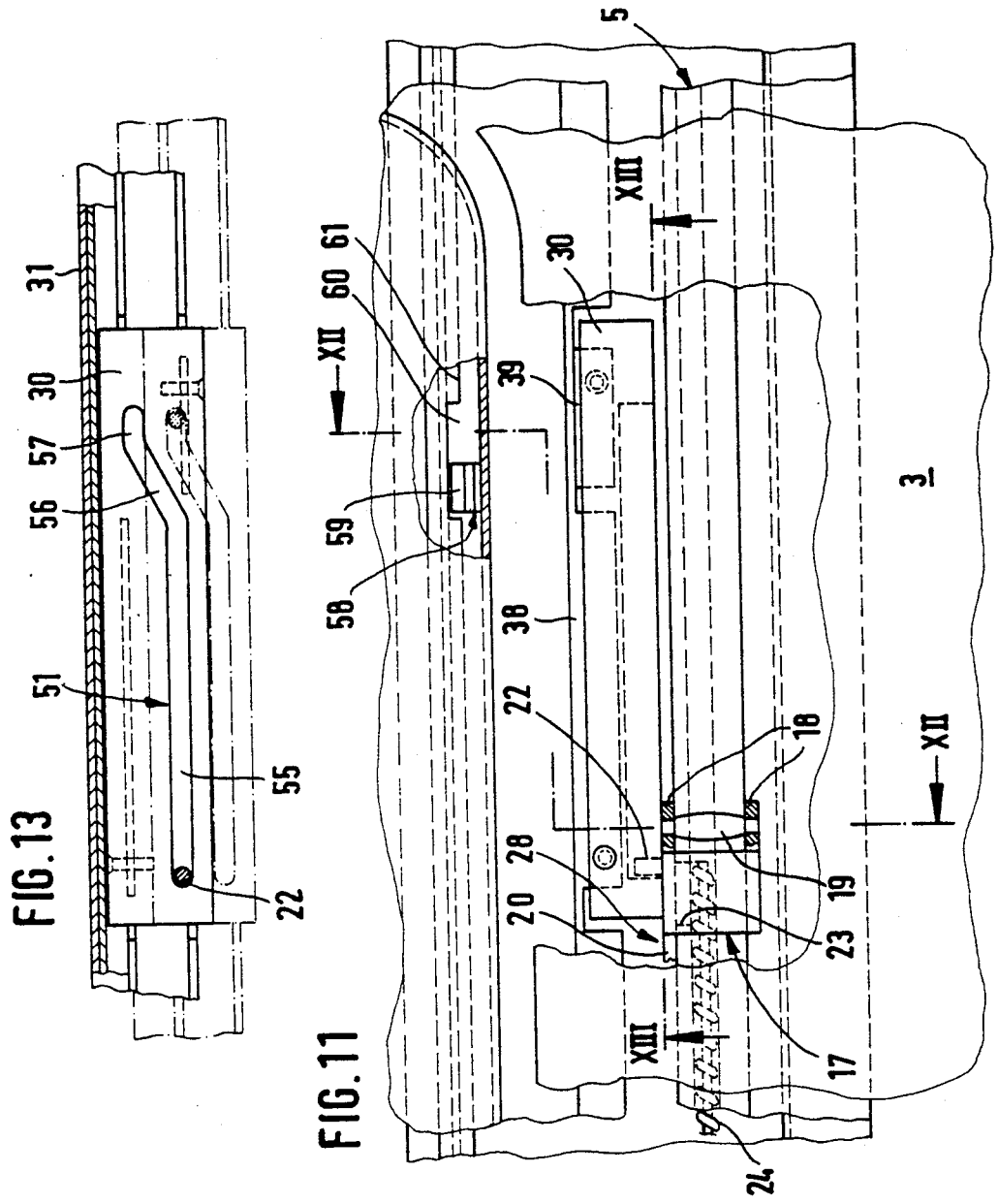

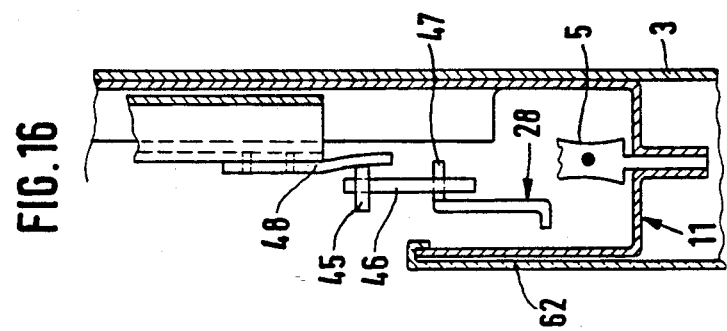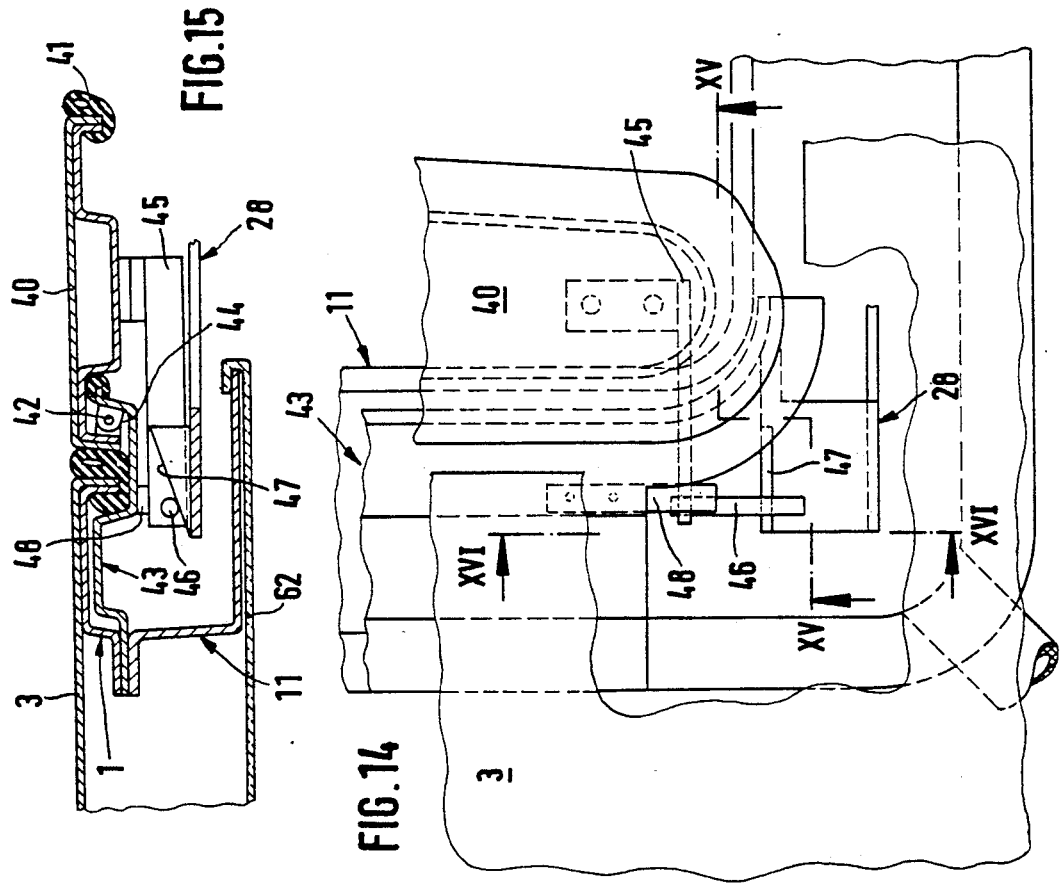

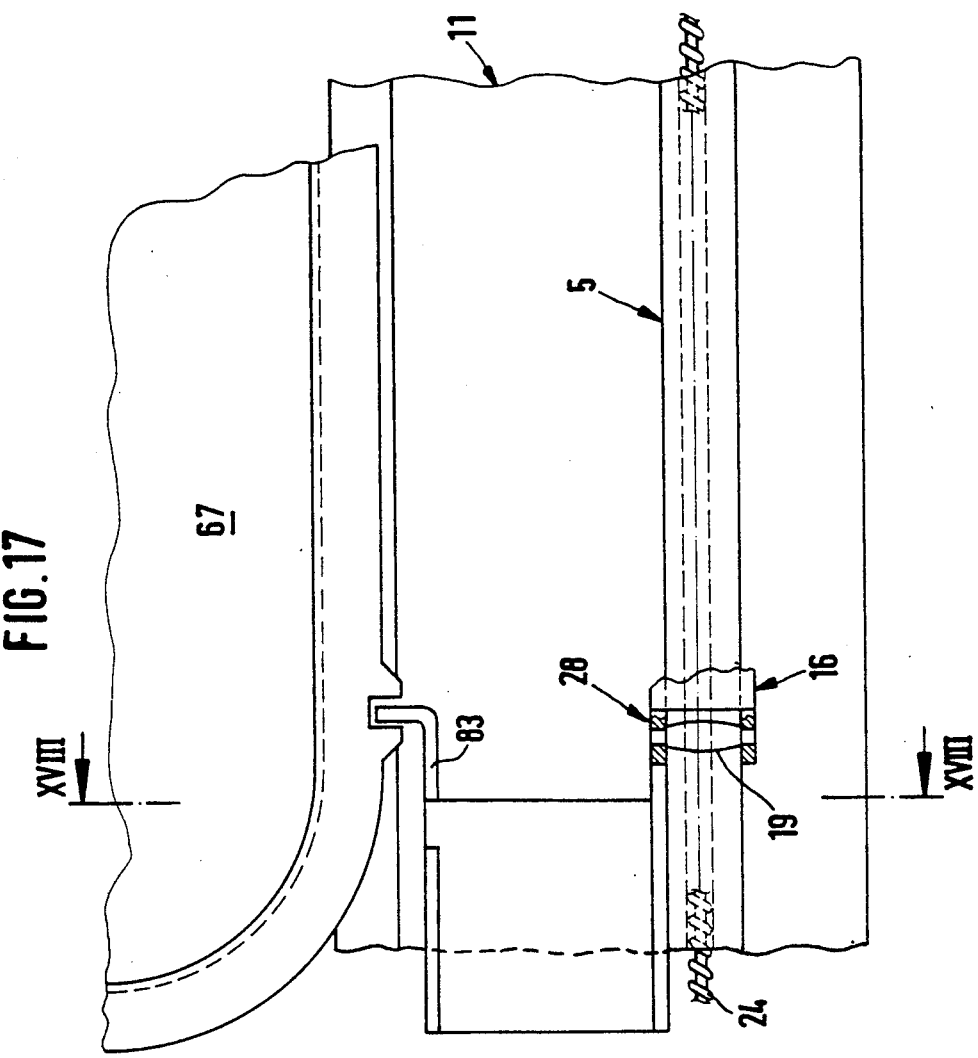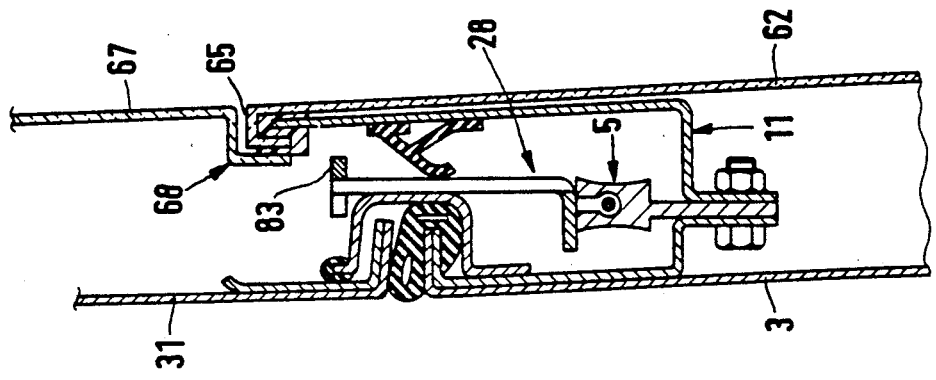

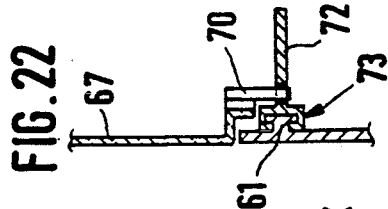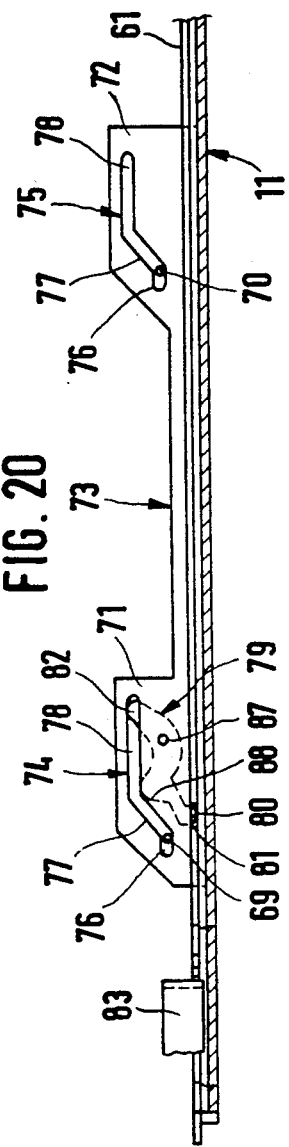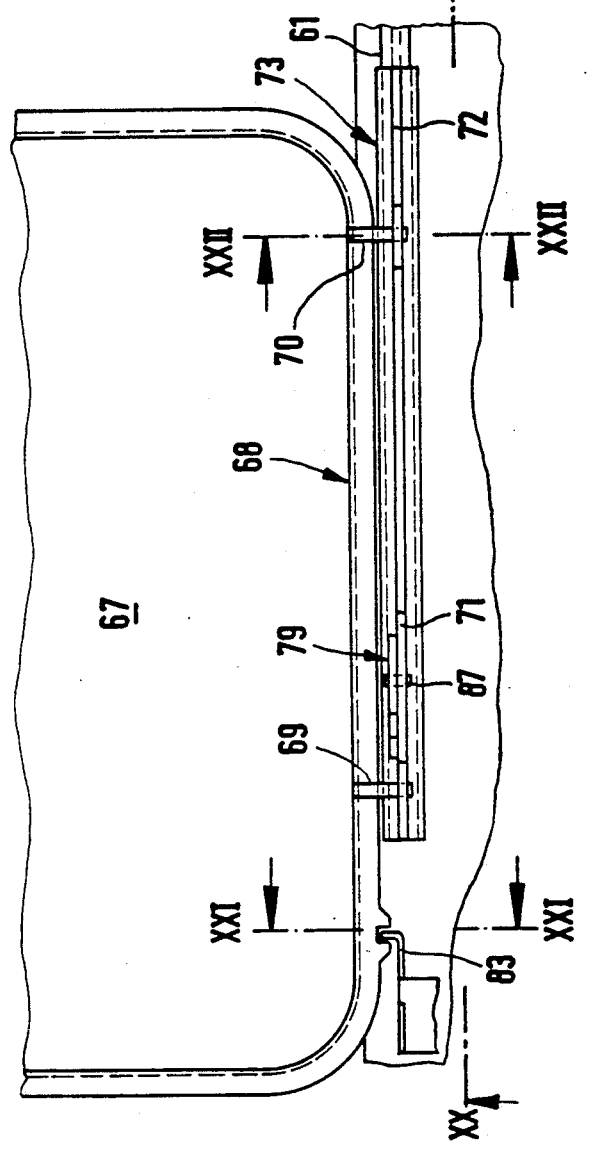

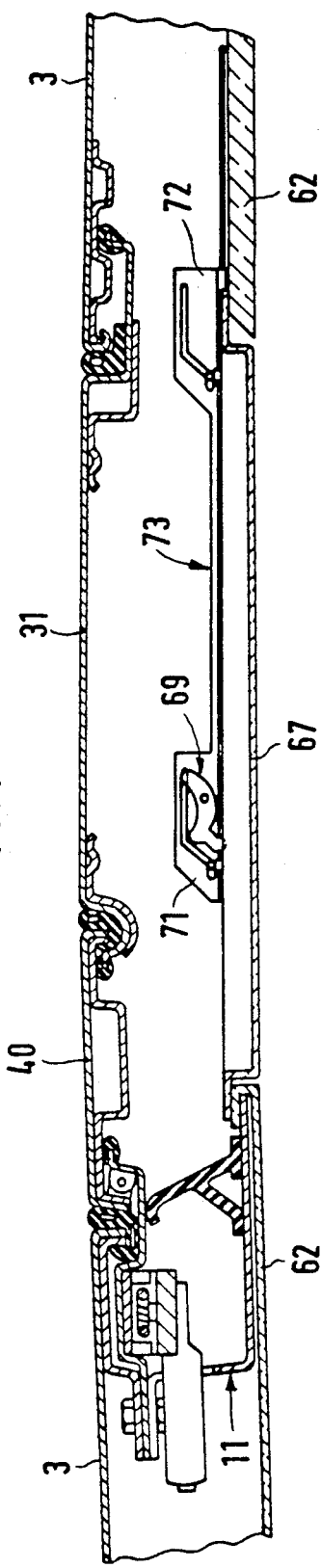
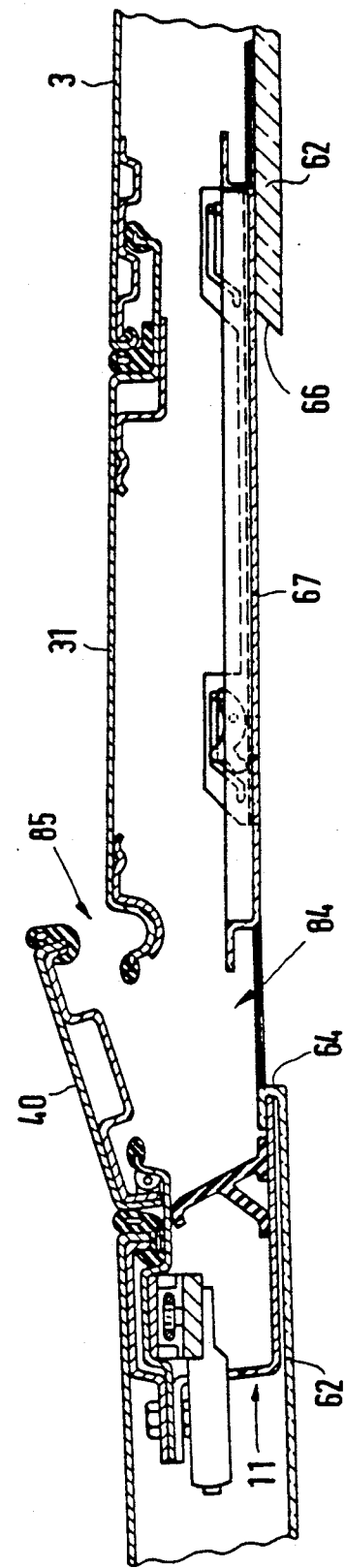

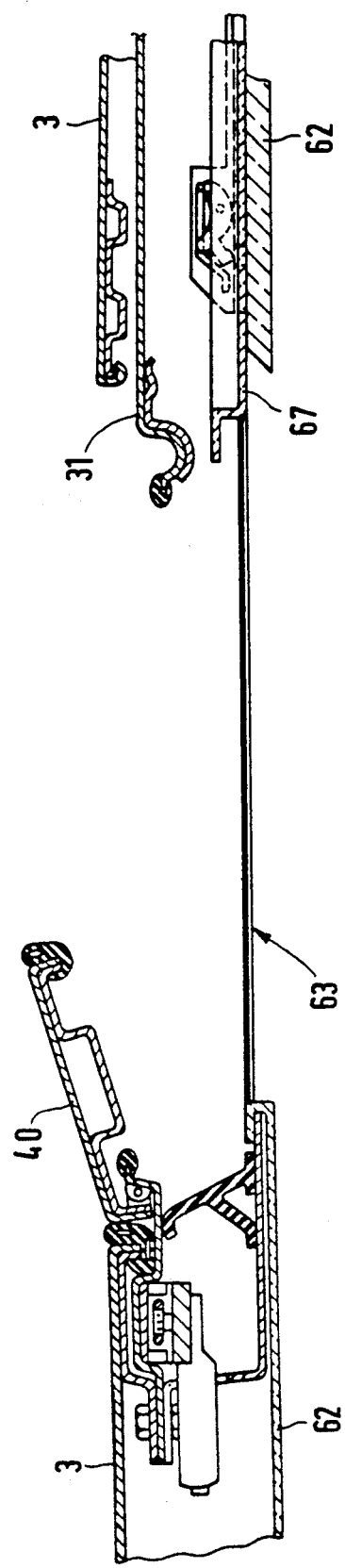

SLIDING ROOF FOR AN AUTOMOBILE

BACKGROUND OF THE INVENTION

This invention relates to a sliding roof for an automobile.

Such a roof is known which comprises a non-slidable, front wind deflector, pivotal at its forward edge in a roof opening, and a rear sliding lid, slidably guided in the roof opening, which sliding lid when the roof is closed, together with the wind deflector, the rear edge of which it then adjoins with its own front edge, fills the roof opening and, when the wind deflector is pivoted outwards, can be displaced after its rear edge has been lowered entirely or partly underneath the rear, fixed roof surface, the same threaded cable drive assembly being used for the adjusting movements both of the wind deflector and also of the sliding lid.

In a known sliding roof of this type (DE 34 35 791 C2), starting from the closed position of the wind deflector and of the sliding lid, by means of a manual or electric motor drive acting via an actuating cable and lifting-out elements with constant rotational direction of the drive, firstly the wind deflector is pivoted out, and then the rear edge of the lid is lowered and, finally, the sliding lid is pushed in an inclined orientation, the wind deflector still remaining pivoted out, underneath the rear, fixed roof surface. The drive can be stopped when the various individual positions are reached. With this movement sequence, and with the wind deflector pivoted out and sliding lid closed, a draught-free ventilation of the vehicle interior can be achieved. The roof opening can be exposed almost completely by pushing the sliding lid underneath the rear roof surface.

In order to achieve adequate ventilation of the vehicle interior when the sliding lid of this known sliding roof is closed, the wind deflector must be pivoted upwards at its rear edge through a large angle, in order to obtain a sufficiently large ventilation gap relative to the front edge of the closed sliding lid. Thus the wind deflector rear edge projects by a considerable amount above the lid surface, flush with the roof surface, and this not only leads to an increase in the air resistance of the vehicle but also to air current noises that decrease travelling comfort. Furthermore, in this known sliding roof, the sliding lid, pivoted downwards about a pivot axis located in the vicinity of the front edge of the lid, must be slid in an inclined orientation under the fixed roof surface during the opening displacement. For this purpose, a considerable distance is necessary between the fixed roof surface and the bottom of the lid housing box facing towards the vehicle interior. In this way the height of the vehicle interior is reduced and headroom is limited.

SUMMARY OF THE INVENTION

An object of the present invention is to improve the air exchange between the vehicle interior and the environment, while at the same time reducing the aerodynamic flow resistance and the overall depth of the sliding roof construction.

According to the present invention, there is provided a sliding roof for an automobile, comprising a non-slidable, front wind deflector, pivotal at its front edge in a roof opening, and a rear sliding lid, slidably guided in the roof opening, which sliding lid, when the roof is closed, together with the wind deflector, fills the roof opening, wherein the sliding lid, in its closure position, is pivotally journalled about a pivot axis provided in the vicinity of its rear edge in the sense of lowering its front edge, with the result that a ventilation gap of adjustable height is formed between the rear edge of the wind deflector and the front edge of the sliding lid.

Preferably, the sliding lid, after its rear edge has been lowered with the wind deflector pivoted out, is displaceable entirely or partly underneath a rear, fixed roof surface, a threaded cable drive assembly being used for the actuating movements both of the wind deflector and of the sliding lid.

It thereby becomes possible to manage with a relatively small pivoting out angle for the wind deflector, because the lowered front edge of the sliding lid makes possible a relatively large ventilation gap. Since, in the present sliding roof, in addition to the lowerable rear edge the front edge can also be lowered, the sliding lid can be slid in an orientation which is approximately parallel to its closed orientation, underneath the rear, fixed roof surface during the opening displacement. In this way the overall height of the sliding roof construction can be kept small.

By the smaller pivoted-out angle of the wind deflector made possible by this invention, the roof contour and therefore the air flow are only comparatively little disturbed. The ventilation opening is situated in the region of the highest suction of the air flow, so that even with the wind deflector pivoted out by only a small angle, a large air throughput is achieved. By the wind deflector pivoted out to a small angle, a quietening of the air flow and thus a reduction in noise is also achieved.

The advantageous effects of the present sliding roof and of the air gap between the rear edge of the wind deflector and the front edge of the sliding lid are first found even when the wind deflector is still in its unpivoted at-rest position, but the front edge of the sliding lid has already been lowered. It is also possible, with good success, to lower the front edge of the sliding lid simultaneously with the pivoting out of the wind deflector. Preferably, however, the arrangement is such that the sliding lid can be driven for lowering its front edge only when the wind deflector is pivoted fully out. This leads to an increase in the free flow cross-section in the ventilation position of the wind deflector while retaining the favourable aerodynamic flow conditions. Therefore, with the combination of lowering the lid front edge and pivoting out the wind deflector, an optimum is achieved for the volume of air flow.

Preferably, the assembly is so arranged that the rear edge of the sliding lid cannot be lowered, nor the fully lowered sliding lid slid underneath the rear fixed roof surface, until its front edge is lowered. If, therefore, starting from the setting of the maximum possible ventilation gap between the rear edge of the wind deflector and front edge of the sliding lid, the area of the roof opening is to be exposed, partially or completely, by partial or complete displacement of the sliding lid, then first of all the rear edge of the lid must also be lowered, before the opening displacement can commence.

In an advantageous form of embodiment, it is provided that the wind deflector is subject to a spring force acting in the direction of outward pivoting and is held in its closed position by a wedge assembly, acting on the wind deflector or components connected therewith, this wedge assembly being generally horizontally displaceable by means of the threaded cable drive device, and when the wedge assembly is displaced in the opening direction the wind deflector is gradually released to pivot out and, when the wedge assembly is displaced in the closure direction, is caused to pivot in against the spring force. In this manner the stated sequence of movement of the wind deflector is achieved, the outward pivoting movement being created by spring force, while the inward pivoting movement is positively controlled.

The displacement movement and the thereby controlled sliding lid movements can be realised in an advantageous manner if, on either side of the roof opening, roller trolleys or the like force-transmittingly connected to the cable drive assembly are displaceable generally horizontally on guide rails, a front and a rear control pin being fixed to each roller trolley, these pins engaging in slide tracks of control blocks fixed laterally on the sliding lid. With this arrangement, the control pins cause not only the vertical and horizontal lid displacement, but they also act as pivot bearings in the lowering of the front edge and rear edge of the sliding lid. When the front edge is lowered, the sliding lid pivots about the rear control pins and when the rear edge is lowered, the sliding lid pivots about the front control pins.

A lining plate which covers the wind deflector and sliding lid in their closed position from below can be provided, which is mounted so as to be slidable and raisable relative to an opening in the lining corresponding to the roof opening and is force-transmittingly coupled to the roller trolleys or the like for the sliding movement, this lining plate being simultaneously lifted out of the lining opening by a control apparatus during the outward pivoting movement of the wind deflector and being slid open to form an inner ventilation opening between the front edge of the lining plate and the adjacent edge of the liner opening, while the sliding lid is still held in its closed position. In this manner it is ensured that the lining plate is already displaced backwards at the start to create a ventilation opening which is associated with the ventilation gap between the rear edge of the wind deflector and the front edge of the sliding lid.

For the desired movement sequence of the elements of the sliding roof, including the lining plate, the arrangement is preferably such that the roller trolleys or the like are coupled to the lateral edges of the lining plate force-transmittingly in the horizontal direction and slidably in the vertical direction, and that the control apparatus comprises sliders, slidably mounted on either side of the lining plate, to which sliders control plates are fitted in guide slits of which front and rear guide pins fixed to the lining plate slidably engage, locking elements being associated with the sliders, by which the sliders, during the lifting movement of the lining plate and during the opening displacement of the lining plate forming the ventilation opening, are locked against displacement movements, but thereafter are unlocked by the forward guide pins and are released for common further opening displacement together with the roller trolleys.

The invention also extends to an automobile incorporating the present sliding lid.

BRIEF DESCRIPTION OF THE DRAWINGS

For a better understanding of the invention and to show how the same may be carried into effect, reference will now be made, by way of example, to the accompanying drawings, in which:

FIG. 2 is a detailed part plan, partly cut away, on the closed sliding roof,

FIG. 3 is a longitudinal section of the fully closed sliding roof along line III—III in FIG. 2, FIG. 4 is a longitudinal section corresponding to FIG. 3, with wind deflector pivoted out, FIG. 5 is a longitudinal section corresponding to FIG. 3, with wind deflector pivoted out and sliding lid lowered at its front edge.

FIG. 6 is a longitudinal section corresponding to FIG. 3, with wind deflector pivoted out and sliding lid lowered also at its rear end, i.e. completely, FIG. 8 is a part plan, partly cut away, on one side of a sliding roof, showing the front region of a roller trolley, FIG. 9 is a cross-section corresponding to the cranked line IX—IX of FIG. 8, FIG. 10 is a longitudinal section corresponding to line X—X in FIG. 8, FIG. 11 is a part plan, partly cut away, on the side of the sliding roof corresponding to FIG. 8, but relating to the rear region of the roller trolley, FIG. 12 is a cross-section corresponding to the cranked line XII—XII of FIG. 11, FIG. 13 is a longitudinal section corresponding to line XIII—XIII in FIG. 11, FIG. 14 is a part plan, partly cut away, of a lateral end region of the wind deflector and its functional components, forming part of the same sliding roof side as FIGS. 8 and 11, FIG. 15 is a longitudinal section corresponding to the cranked line XV—XV of FIG. 14, FIG. 16 is a cross-section corresponding to line XVI—XVI in FIG. 14, FIG. 17 is a part plan, partly cut away, on a front corner of the lining plate and its connection to the roller trolley, forming part of the same sliding roof side as FIGS. 8, 11 and 14, FIG. 18 is a cross-section corresponding to line XVIII—XVIII in FIG. 17, FIG. 19 is a part plan on one side of the lining plate and the control apparatus associated with it, FIG. 20 is a longitudinal section corresponding to line XX—XX in FIG. 19, FIG. 21 is a cross-section corresponding to line XXI—XXI in FIG. 19, FIG. 22 is a cross-section corresponding to line XXII—XXII in FIG. 19, FIG. 23 is a longitudinal section corresponding to FIG. 3, but without the functional parts associated with the wind deflector and sliding lid, but with the functional parts of the lining plate, situated in its closed position, FIG. 24 is a longitudinal section corresponding to FIG. 4 and constructed as FIG. 23, with lining plate lifted and commencing its opening displacement, FIG. 27 is a longitudinal section corresponding to FIG. 7 and constructed as FIG. 23, with lining plate lifted and slid open.

DESCRIPTION OF PREFERRED EMBODIMENTS

Figure 1:
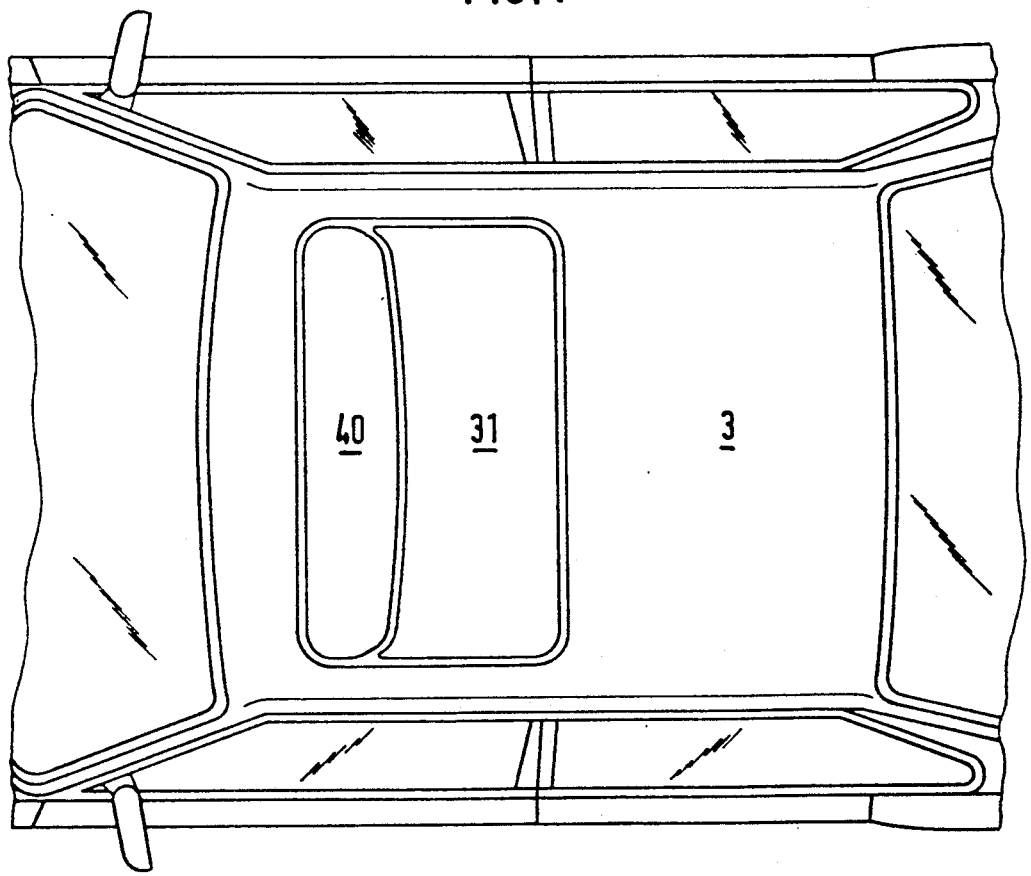
FIG. 1 is a plan view of part of an automobile roof with sliding roof closed.
Figure 7:
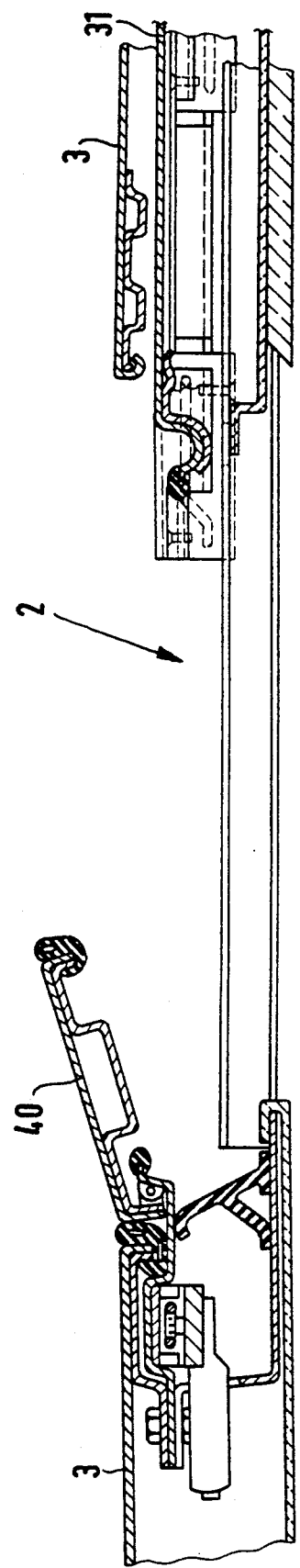
FIG. 7 is a longitudinal section corresponding to FIG. 3, with wind deflector pivoted out and sliding lid slid open beneath the rear, fixed roof surface.

The sliding roof is illustrated largely schematically in the drawings to facilitate understanding, components visible in various views and sections having been omitted for simplification, where these components are not of importance in the relevant descriptive text. In the drawings, only the left side of the sliding roof, as seen in the forward direction of travel of the vehicle, is illustrated, because the right side is substantially the same, to opposite hand.

As is apparent, for instance, from FIGS. 2 to 7, a U-section support frame 1 surrounds the roof opening 2 underneath the front transverse side and the two longitudinal sides of the roof surface 3. The free flanges of this frame extend backwards beneath the fixed roof surface 3. Guide rails 5, along each longitudinal side of the roof opening 2 underneath the fixed roof surface 3, are connected to the flange 4 of the support frame 1, extending outwards from the roof opening 2. These guide rails 5 extend from the front edge 6 of the roof opening also beneath the rear fixed roof surface 3.

As illustrated, for example, in FIGS. 9 and 12, each of the mirror-inverted guide rails 5 has, in cross-section, a fixing flange 7 and a guide flange 8 adjoining this, the mutually opposite guide tracks 9 of which guide flange are concave. The guide tracks 9 enclose between them a laterally, inwardly open cable guide duct 10. A U-section water channel 11 is situated underneath the guide rails 5. It surrounds the roof opening 2 at front and rear and extends with its rear ends beneath the rear roof surface 3. Its cross-section is Z-shaped. Its outwardly situated, upwardly orientated wall 12 is adjoined perpendicularly and horizontally by a fixing flange 13, which is substantially in register with the fixing flange 4 of the support frame 1 and is fixed laterally to this, with the fixing flange 7 of guide rail 5 between them. In the vicinity of the inner edge of the horizontal flange 14 of the water channel 11 orientated towards the roof opening 2, an upwardly directed Y-section sealing profile 15 is fitted as inner boundary to the water channel. This sealing profile 15 extends along the entire length of the water channel 11.

As can be seen, for instance, from FIG. 2, on each side of the roof opening 2 front and rear guide bodies 16, 17 respectively are positioned on the guide rails 5. The guide bodies have a U-section, as indicated for the rear guide body 17 in FIG. 12. Their free flanges are continued forwards and backwards respectively and form bearing plates 18 for convex rollers 19. Each two rollers 19 are rotatably journalled in the bearing plates 18 one above the other so that they bear against the guide tracks 9 of the guide rail 5 above and below with small play. On each side of the roof opening, the front and rear guide bodies 16 and 17 are connected to a roller trolley 28 by a lateral web 20 in such a manner that the two front rollers 19 point forwards and the two rear rollers 19 backwards. Both on the front and on the rear guide body 16 and 17 of the roller trolley, inwardly orientated control pins 21, 22 respectively are fixed.

The rear guide body 17 of the roller trolley is connected via an entraining web 23 with a drive cable 24.

The drive cable 24 is a flexible threaded cable having a helical working winding. The cable 24 is guided longitudinally slidable in the sole guide duct 10 of the guide rail 5 in a tension-resistant and compression-resistant manner. The entraining web 23 between the rear guide body 17 and cable 24 projects through the slit of the laterally open cable guide channel 10. Pipes 25 for further cable guidance are pushed into the front ends of the guide rails 5 into the cable guide ducts 10, as shown in FIGS. 2 and 8. The other ends of the pipes 25, pointing towards the centre of the vehicle, are seated in a drive housing 26 in such a way that the drive cables 24, guided in the pipes 25, run parallel to each other and cooperate by their working windings with the teeth of a pinion 27. When the pinion 27 revolves, therefore, the cables 24 are longitudinally displaced like toothed racks opposite to one another. The drive housing 26 is fixed centrally to the support frame 1 in the middle of the front edge 6 of the roof opening. The pinion 27 can be driven by a manual or electric motor drive.

The front and rear control pins 21 and 22, pointing inwards on the two roller trolleys 28, cooperate with front and rear control blocks 29, 30 respectively on the sliding lid 31, as can be seen especially from FIGS. 8 to 13. One front and one rear control block 29 and 30 is fitted to each lateral edge of the lid.

The sliding lid 31, in its closed position, fills the rear region of the roof opening 2 (FIGS. 1, 2). It is shaped in one piece from metal sheet and is dish-shaped so that, starting from an upper lid surface flush with the roof contour, vertically, downwardly pointing cranked flanges 32 are formed around it on all four sides, these flanges then extending horizontally outwards. The outer edge of the sliding lid 31 follows, at a distance, the form of the rear and lateral edge of the roof opening. The front edge of the lid 31 is moulded inwardly to form lateral projections 33, so that the front edge of the lid has a backwardly directed, curved recess. The horizontal lid edges 34, adjoining the downward, vertical flanges 32 of the lid, extend both underneath the rear and also underneath the lateral, fixed roof surface 3. They are formed as water collecting channels 35 and engage beneath the edge of the roof opening 2. In the lateral region, their cross-section corresponds to that of an edge gap seal 36, which is pushed from below onto the downwardly cranked edge of the roof opening. On the rear edge of the lid, there is an edge gap sealing strip 37 in the water collecting channel 35. The free, upwardly orientated flange of the lateral water connecting channel 35 has, at its upper end, a horizontally outwardly directed rim 38. Onto this rim 38, both the front and also the rear control blocks 29 and 30 are pushed on and secured. Additionally, profiled, fixing plates 39, engaging beneath the water collecting duct 35, are fitted to the lateral edges of the lid 31, and onto these fixing plates 39 the control blocks 29 and 30 are also pushed to fix them.

A wind deflector 40 fills the front region of the roof opening. This is constructed as a stiff roof plate, the upper surface of which follows the roof contour. Its edge is cranked downwards all around. On the lateral and rear portions of the rim, a sealing profile 41 is pushed on from below, as can be seen for example from the longitudinal sections in FIGS. 3 to 7. The wind deflector is attached at its front edge by pivot bearings 42 to a support plate 43, which is secured to the front edge of the roof opening underneath the fixed roof surface 3 between support frame 1 and water channel 11 and projects towards the roof opening 2, forming a water gutter 44. The wind deflector 40 is in active connection, via lateral, forwardly directed arms 45 and outwardly projecting pins 46 attached thereto, with wedge surfaces 47, which are formed on the forward ends of the roller trolleys 28, as can be seen in FIGS. 14 to 16. The release of the pivoting movement of the wind deflector 40 takes place by longitudinal displacement of the fixed ramp-like wedge surfaces 47 on the roller trolleys 28. The pivoting itself is caused by leaf springs 48, which are fixed laterally to the support plate 43 and act upon the forwardly directed arms 45 of the wind deflector 40. In the closed condition, the rear edge of the wind deflector engages, by the pushed-on sealing profile 41, into the front edge of the sliding lid 31, formed as a water gutter 49.

Starting from the closed position of the sliding roof illustrated, for instance, in FIG. 3, in which wind deflector 40 and sliding lid 31 close the roof opening 2, the threaded cables 24 are longitudinally displaced in opposite directions in the cable guides by rotation of the drive pinion 27. The portions of the cables in the cable guide ducts 10 of the guide rails 5 are attached to the roller trolleys 28. In this way the roller trolleys are displaced longitudinally on the guide rails when the drive is actuated. The front ends of the roller trolleys 28, equipped with the wedge surfaces 47, first facilitate the outward pivoting of the spring-loaded wind deflector 4 as the roller trolleys move backwards, by the wedge surfaces sliding underneath the laterally projecting pins 46 of the deflector arms 45. The wind deflector 40 pivots as far as the position shown in FIG. 4 about its bearing points 42 under the action of the leaf springs 48, forming with its rear edge a ventilation gap 85.

As can be seen from FIGS. 8 to 10 for the forward region and 11 to 13 for the rear region, the control pins 21, 22 mounted on the roller trolleys 28, cooperate with slide tracks 50, 51, respectively in the forward and rear control blocks 29 and 30. The shape of the slide track 50 in each front control block 29 (FIG. 10) commences first with a forward, horizontal portion 52. This is followed by a middle, upwardly ascending portion 53, which then leads into a rear, elongate horizontal portion. The slide tracks 51 in each control block 30 (FIG. 13) commence with an elongate horizontal front portion 55. This is followed by an upwardly ascending, middle portion 56, which continues into a horizontal, rear portion 57.

During the backward movement of the roller trolley 28 which releases the pivoting motion of the wind deflector 40, the front control pin 21 moves in the front, horizontal portion 52 of the slide track 50 of the front control block 29. The rear control pin 22 moves in the front horizontal portion 55 of the rear control block 30. By the guidance of the two control pins 21, 22 in a horizontal direction, the sliding lid 31 at first remains in an at-rest position, i.e. closed, during the pivoting movement of the wind deflector. After the outward pivoting movement of the wind deflector 40 is completed, the first ventilation position is reached. If this is to be maintained unchanged, the drive is now stopped.

If the ventilation effect is now to be strengthened, the front edge of the sliding lid 31 is additionally lowered, in the following manner. By activation of the drive, the roller trolleys 28 are moved further backwards. The front control pin 21 now enters the middle portion 53 of the slide track 50 in the front control block 29. The rear control pin 22 moves further in the front horizontal portion 55 of the slide track 51 of the rear control block 30. Thus the lid front edge is lowered, while the rear edge of the lid remains generally in the position flush with the roof surface 3, as FIG. 5 shows.

This second ventilation position can also be retained by stopping the drive.

If the sliding lid 31 is to be displaced backwards underneath the fixed roof surface 3, for full or partial exposure of the roof opening 2, this is achieved by renewed operation of the drive. The roller trolleys 28 are moved further backwards. The front control pin 21 now moves in the rear, horizontal portion 54 of the slide track 50 in the front control block 29. The rear control pin 22 simultaneously slides in the upwardly ascending, middle portion 56 of the slide track 51 of the rear control block 30. In this way the rear edge also of the sliding lid is lowered, as FIG. 6 shows.

As can be seen, for example, from FIGS. 11 and 12, to each side of the lid a holding-down device 58 is fixed, which in this position of control pins and slide tracks is situated, with a downwardly pointing, hook-shaped end 59, above a window-like opening 60 in a T-shaped member 61, which projects upwards from the horizontal base near the inner edge of the lateral water channel 11 and integral with this channel. The T-section member 61 extends over the entire length of the lateral water channel 11. When the rear edge of the lid is lowered, the hook-shaped end 59 of holding-down device 58, after passing through the opening 60, engages underneath the horizontal flange of the member 61. The sliding lid 31 is now in the horizontal longitudinal sliding position. The control pins 21, 22 bear against the ends of the slide tracks 50, 51 respectively, as soon as the rear control pin 22 has passed through the horizontal, rear portion 57 of the slide track 51 of the rear control block 30. An undesired lifting of the rear edge of the lid during the sliding operation is prevented by the engagement of the holding-down device with the T-shaped member.

With further continuance of the rotary drive movement and thus further backward movement of the roller trolleys 28, the fully lowered sliding lid 31 is pushed by the control pins 21, 22 respectively, engaging the ends of the slide tracks 50, 51, beneath the rear roof surface 3 (FIG. 7), the hook-shaped end 59 of the holding-down device 58 being guided underneath the horizontal transverse flange of the member 61.

The entire movement sequence from pivoting of wind deflector to sliding of lid can be achieved also with uninterrupted drive operation. By interrupting the drive, however, any intermediate position can be set.

The closure operation of lid and wind deflector takes place basically in the reverse sequence, the cooperation of the lid holding-down device 58 and opening 60 ensuring that the lifting movement of the rear edge of the lid cannot commence until the lid is situated in a horizontal orientation exactly beneath the roof opening (FIG. 6). This position is reached when the opening 60 allows passage of the lid holding-down device 58. During the forward displacement of the lid, the hook-shaped end 59 of the holding-down device 58 has prevented a lifting of the rear edge of the lid, by its bearing from below against the transverse flange of the member 61.

For a more detailed explanation of the lining plate arrangement, reference is now made to FIGS. 17 to 27. In the roof liner 62, forming the upper boundary of the vehicle interior, a liner opening 63 is cut out underneath the roof opening 2. Its size corresponds basically to that of the roof opening 2. The front edge 64 and the two lateral edges 65 of the liner opening 63 are bounded by the inner edges of the water channel 11. The rear edge 66 is situated underneath the rear edge of the roof opening and is flush with it. The front edge 64 and lateral edges 65 of the liner opening 63 are bent around the flanges of the relevant edges of the water channel 11 and secured to them.

A lining plate 67 is fitted into the liner opening 63 in such a manner that its lower face is flush with the surface of the roof liner 62. The lateral edges 68 of the lining plate 67 are bent upwards and then laterally outwards at the ends all around, so that they rest from above on the edges 64 to 66 of the liner opening. With each of the lateral edges 68 of the lining plate 67, a front and a rear guide pin 69, 70 respectively is connected. The free ends of the guide pins 69, 70 point outwards and cooperate each with a lateral control plate 71, 72 respectively. The two control plates 71, 72 are a component of a slider 73, which is mounted longitudinally slidable on the T-shaped member 61 of the horizontal base of the lateral water channel 11 (FIG. 20).

The upwardly orientated control plates 71, 72 comprise guide slits 74, 75 respectively, into which the guide pins 69, 70 respectively of the lining plate 67 engage. The guide slits 74, 75 of the control plate 71, 72 both have the same shape. They are composed of a first, horizontal portion 76, an ascending, second portion 77 adjoining thereto, which at a vertical distance from the first portion 76 is then followed horizontally by a third portion 78.

On the front control plate 71, in the region of the guide slits 74, there is a locking element 79, which engages with a downwardly orientated nose 80 into an opening 81 on the T-section member 61 of the base of the water channel 11 and thereby blocks a displacement of the slider 73. The upper end 82 of the locking element 79 is situated in the region of the third horizontal portion 78 of the guide slit 74 and therefore makes possible, in cooperation with the front guide pin 69, a cancellation of this blocking. So long as a blocking of the slider 73 with the T-section member 61 exists, the guide pins 69, 70 of the lining plate 67, and therefore the lining plate itself, can move only within the regions of the guide slits 74, 75.

The lining plate 67 is drivingly connected, by front connecting arms 83 mounted on the roller trolleys 28, with these roller trolleys 28 and is synchronously moved with them, as FIG. 17 illustrates. Starting from the closed position of the lid, the roller trolleys 28 are in their front position. The lining plate 67 is now situated within the liner opening 63 and is connected by the connecting arms 83 to the roller trolleys 28. The sliders 73 with their control plates 71, 72 are locked to the T-shaped members 61 of the base of the water channel 11 and are therefore stationary. The guide pins 69, 70 of the lining plate 67 are in engagement with the first horizontal portions 76 of the guide slits 74, 75 of the control plates.

A displacement of the roller trolleys 28 backwards by actuation of the drive first causes a pivoting of the wind deflector 40 upwards. While the roller trolleys 28 traverse the distance as far as the end of the pivoting movement of the wind deflector 40, the lining plate 67 moved by the roller trolleys 28 is first raised obliquely upwards out of the liner opening 63 by the guide pins 69, 70, because these pins 69, 70 are guided in the ascending guide slit portions 77 of the arrested control plates 71, 72. In order not to impede lifting of the lining plate 67 backwards and upwards, the rear edge 66 of the liner opening 63 is chamfered at an angle which is smaller than the angle of ascent of the upward oblique portions 77 of the guide slits 74, 75.

Still during the displacement of the roller trolleys 28 for the outward pivoting of the wind deflector 40, the guide pins 69, 70 of the lining plate 67 enter the third, horizontal portion 78 of the guide slits 74, 75. Consequently, the now raised lining plate 67 is pushed backwards by a small distance relative to the still stationary slider 73, in order to maintain an inner ventilation opening 84 in cooperation with the ventilation gap 85, achieved by the outward pivoting of the wind deflector. This situation is illustrated in FIG. 24.

Figure 25:
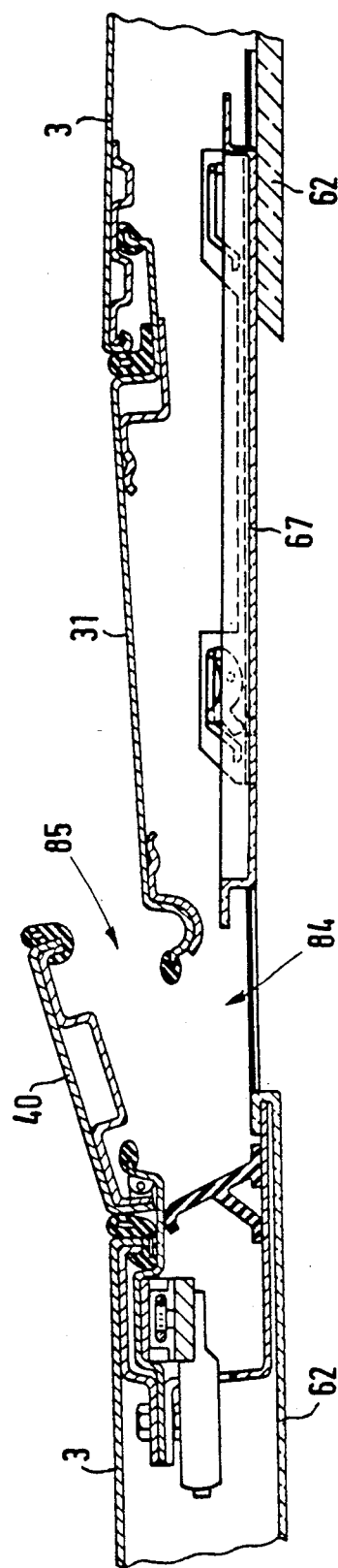
FIG. 25 is a longitudinal section corresponding to FIG. 5 and constructed as FIG. 23, with lining plate lifted and commencing its opening displacement.

A continuing displacement of the roller trolleys 28 backwards causes the already described lowering of the front edge of the sliding lid 31. While the roller trolleys 28 traverse the distance as far as the end of the descending movement of the front edge of this lid, the lining plate 67 is pushed backwards by its guide pins 69, 70, further into the third horizontal portions 78 of the guide slits 74, 75 in the still locked control plates 71, 72, until the front edge of the lining plate 67 is approximately in register with the lowered front edge of the lid (FIG. 25). With this movement, the inner ventilation opening 84 is further increased and allows for the enlarged, outer ventilation gap 85.

Figure 26:
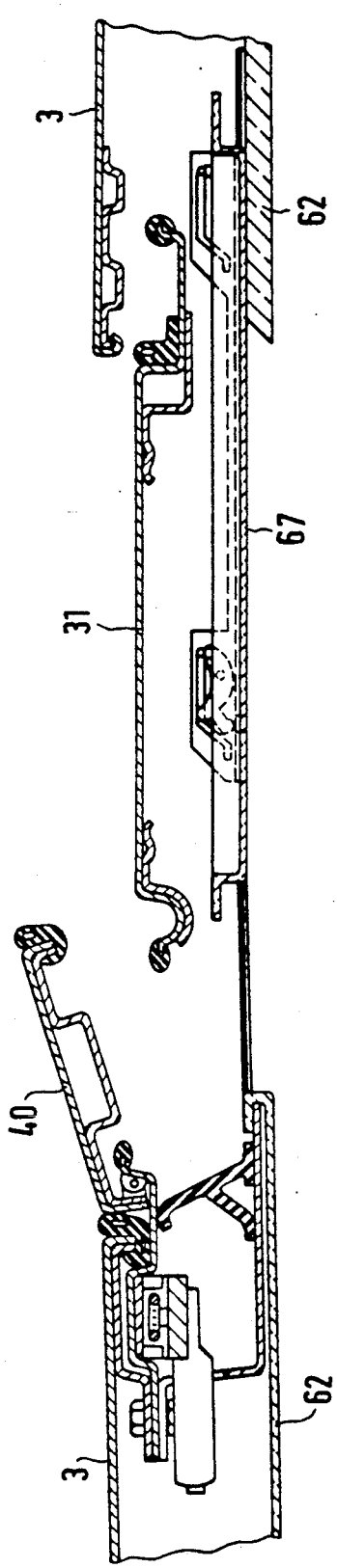
FIG. 26 is a longitudinal section corresponding to FIG. 6 and constructed as FIG. 23, with lining plate lifted and commencing its opening displacement.

If the opening of the sliding roof is continued and the roller trolleys 28 traversed further backwards, the rear edge of the lid is lowered and the sliding lid 31 arrives at a horizontal, displaced position (FIG. 26). The front guide pin 69 of the lining plate 67 has, in the third horizontal portion 78 of the guide slit 74 in the control plate 71, reached the upper end 82 (FIG. 20) of the locking element 79 and pivoted this element about a pivot pin 87, so that the lower nose 80 of the locking element 79 is moved out of the opening 81 of the T-section member 61.

The locking is now cancelled and the sliders 73 together with control plates 71, 72 are pushed backwards synchronously with the sliding lid 31 by the guide pins 69, 70 of the lining plate 67, which have now reached the ends of the guide slits 74, 75 respectively. In the further course of the displacement of the lid 31 beneath the rear roof surface 3, the lining plate 67 is also slid underneath the roof surface 3 by the roller trolleys 28, via the connecting arms 83. The lining plate bears, during the displacement operation, on the lateral control plates 71, 72. The closure operation of the lining plate takes place substantially in the reverse sequence.

In the unlocking pivoting movement of the locking element 79, an upwardly projecting cam or hump 88 (FIG. 20) arrives in the region of the horizontal portion 78 of the guide slit 74. This cam 88 ensures that, when the guide pin 69 of lining plate 67 runs onto it during the closure sliding of the lid 31, a pivoting-back of the locking element 79 occurs until the nose 80 engages in the recess 81, and thereby again assures locking of the slider 73.

We claim:
1. A sliding roof for an automobile having a roof opening comprising:
a front wind deflector pivotally mounted about a front edge of said roof opening and a rear sliding lid which may be slid along a path with respect to said front wind deflector to define a selectable dimensioned roof opening;

said sliding lid in conjunction with said wind deflector together in a first position fill the roof opening;

said sliding lid having a first pair of control blocks disposed on a front portion on opposing sides, and a second pair of control blocks disposed on a rear portion on opposing sides;

said control blocks including a vertically disposed planar portion oriented in a direction parallel to said path of said sliding lid;

a first pair of trolleys slidably disposed on opposing tracks disposed on opposing sides of said roof opening, and a second pair of trolleys axially displaced from said first pair of trolleys and slidably disposed on said tracks;

means for displacing said first and second pair of trolleys along said opposing tracks to selectable positions therealong;

control pins disposed on each said trolley and slidably engaging a respective opening defined in said vertically disposed planar portion of each said control block;

each said opening defining a slide track having a shape which defines a height of the respective sliding lid portion;

said first pair of control blocks each having one of said slide tracks having a forward horizontal portion followed by a middle upwardly ascending portion and a rear elongate horizontal portion;

said second pair of control blocks each having one of said slide tracks having a forward elongate horizontal portion followed by an upwardly ascending middle portion and a horizontal rear portion;

wherein said front portion of said sliding lid is lowered by said control pins sliding in said middle upwardly ascending portion of said slide tracks in said first pair of control blocks and said rear portion of said sliding lid is pivoted about said control pins disposed in said forward elongate horizontal front portion of said slide track in said second pair of control blocks; and wherein said front portion of said sliding lid is pivoted about said control pins disposed in said rear elongate horizontal portion of said slide track in said first pair of control blocks and said rear portion of said sliding lid is lowered by said control pins sliding in said upwardly ascending middle portion of said slide track in said second pair of control blocks.

2. The invention of claim 1 further comprising means for maintaining said front wind deflector in a first position.

* * * * *